(12) United States Patent
Tano

(10) Patent No.: US 6,427,355 B1
(45) Date of Patent: Aug. 6, 2002

(54) GAUGE BLOCK

(75) Inventor: Keishi Tano, Miyazaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/481,442

(22) Filed: Jan. 13, 2000

(30) Foreign Application Priority Data

Jan. 14, 1999 (JP) .......................................... 11-007801

(51) Int. Cl.⁷ ................................................ G01B 3/30
(52) U.S. Cl. ........................................ 33/567; 33/502
(58) Field of Search .............................. 33/567, 501.45, 33/502; 73/1.01

(56) References Cited

U.S. PATENT DOCUMENTS 3,956,092 A      5/1976   Kampe et al. ................. 33/567
4,842,945 A  *  6/1989   Ito et al. ...................... 428/457
5,455,081 A  * 10/1995   Okada et al. ................ 427/528
5,511,587 A  *  4/1996   Miya et al. .................. 139/192
5,629,086 A  *  5/1997   Hirano et al. ............... 428/336
6,045,029 A  *  4/2000   Scott ........................ 228/122.1

FOREIGN PATENT DOCUMENTS

JP      B2-8-20201       3/1996

* cited by examiner

Primary Examiner—Christopher W. Fulton
(74) Attorney, Agent, or Firm—Oliff & Berridge, PLC

(57) ABSTRACT

A gauge block which has excellent abrasion and corrosion resistances without time-dependent changes in dimension that can be produced inexpensively. A method of producing the gauge block using raw steel and processing it into a gauge block body, then finish polishing it, and ion plating a super thin DLC film (2) over its surface.

4 Claims, 1 Drawing Sheet

GAUGE BLOCK

BACKGROUND OF THE INVENTION

1. Field of Invention

The invention relates to a gauge block used as a standard when measuring an accurate length dimension.

2. Description of Related Art

A gauge block has been employed as a standard when measuring an accurate length dimension. A gauge block is required to have excellent abrasion and corrosion resistance because it is the standard for the accurate measurement of a dimension. If the gauge block is worn or eroded, it cannot be useful as a standard any longer. In addition, ringing, in which a gauge block is employed so as to contact tightly with another gauge block, cannot be performed. Therefore, steel, ceramics, low thermal expansion glass and so forth have been utilized as materials of a gauge block.

A gauge block made of a metal such as steel does not have sufficient corrosion resistance. Thus, it is necessary to keep a steel gauge block in a completely anti-corrosive environment. This creates a disadvantage in that handling becomes extremely complicated. For example, anti-corrosive gloves must always be worn during handling. It has been attempted recently to improve the abrasion and corrosion resistances of metallic gauge blocks in order to solve the above disadvantages. However, it takes a long time, for selecting materials, heating and so forth. This creates another disadvantage by increasing the production costs.

In particular, to improve the abrasion resistance of a steel gauge block, it is necessary to heat and quench harden the steel gauge block to increase its hardness. The quench hardening causes a structural variation, however, which create the disadvantage of time-dependent changes in dimension. In addition, quench hardening increases the cost.

Some methods have been employed recently to reduce the time-dependent changes in dimension. They include special heat treatments such as a subzero or temper treatment. They also include an artificial aging treatment and natural aging. However, sufficient results are not always achieved. In addition, the special treatment further increases the cost.

Publication JP 8-20201(B) discloses a technology that forms a hard thin film over the reference surface of a gauge block. This technology is mainly directed to preventing the reference surface from being contaminated by forming a hard thin film with a rough surface. The formation of the roughness on the reference surface makes it impossible to perform ringing, in which a plurality of gauge blocks are employed by contacting one reference surface tightly with another. To perform ringing requires a reference surface that has high smoothness and no roughness.

An object of the present invention is to provide a gauge block, which has excellent abrasion and corrosion resistances without being affected by time-dependent changes in dimension and which can be produced inexpensively.

SUMMARY OF THE INVENTION

The present invention is a gauge block, which includes a gauge block body and a diamond-like carbon film coated thereon.

In the present invention, the gauge block body may preferably include a raw steel material that is not hardened or a raw steel material having at least one reference surface which is quench hardened.

According to the present invention, the performance and reliability of the gauge block can be improved by coating the gauge block body with diamond-like carbon film (DLC film) that has excellent abrasion and corrosion resistance.

In a case where non-hardened raw steel material is employed as the gauge block body, a stable gauge block, usable for a long time can be obtained. This is due to the absence of time-dependent changes in dimension due to the structural variation that are caused when the material is quench hardened. In addition, quench hardening, special heat treatments (subzero and temper treatments), artificial aging treatment and natural aging are not required. Thus, the production cost and time can be reduced.

The gauge block body to be coated with DLC may also include ceramics or low heat-expansion glass. The ceramics are preferably ceramics mainly consisting of zirconia (zirconium oxide: $ZrO_2$). The low heat-expansion glass may be a solid solution type as including 60–70 wt. % silicon dioxide, $SiO_2$, as the main part, 15–25 wt. % aluminum oxide, $Al_2O_3$, and 1.5–5 wt. % of lithium oxide, $LiO_2$.

The coating of the DLC film may be performed by a physical vapor deposition (PVD) method, preferably a multi-arc ion plating method that can form a super thin DLC film with a thickness of several nm or less with good controllability. The DLC film to be formed is amorphous and the surface is smooth and has a low coefficient of friction. Accordingly, by polishing the gauge block body so that the dimension between the reference surfaces become a desired value, finish polishing would not be required after the DLC film is formed.

Other features and advantages of the invention will be apparent from the following description of the preferred embodiments thereof.

BRIEF DESCRIPTION OF THE DRAWINGS

The invention will be more filly understood from the following detailed description with reference to the accompanying drawings in which.

DETAILED DESCRIPTION OF PREFERRED EMBODIMENTS

Figure 1A:
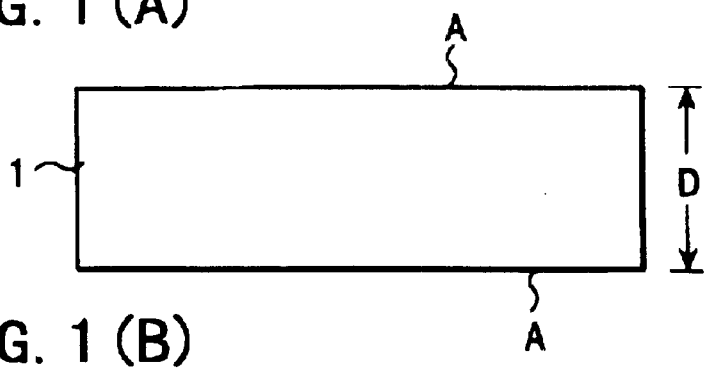
FIGS. 1(A) and 1(B) are diagrams showing process steps of producing a gauge block according to an embodiment of the present invention.
Figure 1B:
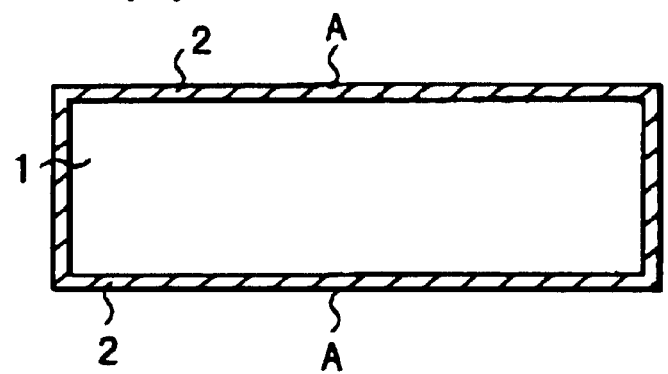

Embodiments of a gauge block according to the invention will be described below with reference to the drawings. FIGS. 1(A) and 1(B) are cross-sectional views showing the process steps of producing the gauge block. FIG. 1A shows a processed cross section of a gauge block body 1. In this embodiment, the gauge block body 1 is made of a raw steel material that is not quench hardened. Reference surfaces A are processed to achieve a desired dimension D therebetween and are finish polished.

Figure 2:
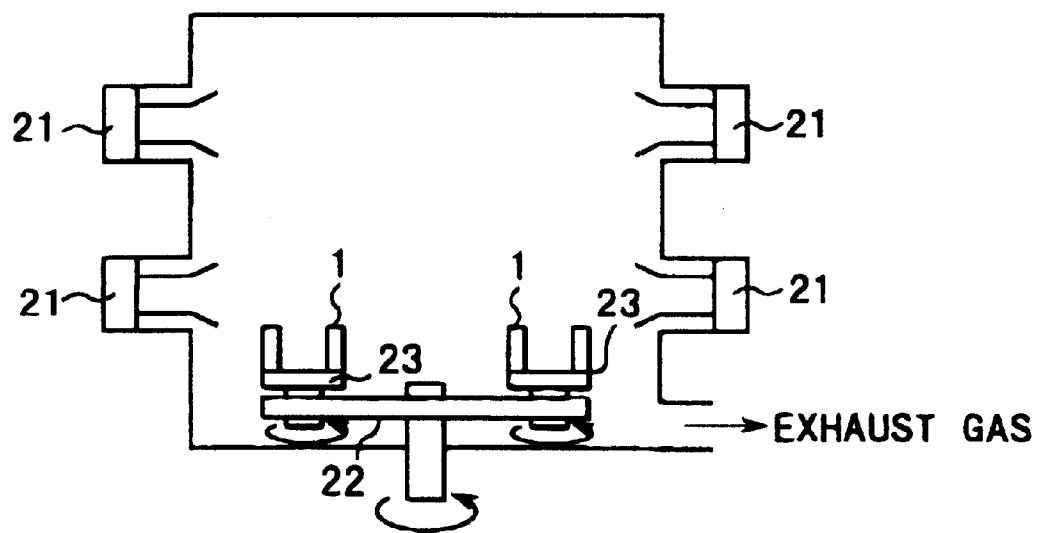
FIG. 2 is a diagram showing ion-plating equipment for forming a DLC film according to the embodiment.

Next, a DLC film 2 is formed over surfaces of the gauge block body 1 as shown in FIG. 1B. Ion plating is employed to form the DLC film 2 in this embodiment. As shown in FIG. 2, the ion plating equipment is of multi-arc type, which includes a plurality of ion sources 21. A substrate holder is a holder of autorotation/revolution type, including a main holder 22 that is driven to rotate and sub holders 23 that are driven to rotate on the main holder. The gauge block body 1 is mounted on the sub holder 23, maintaining the reference surface A perpendicular to the sub holder 23 when forming the DLC film. A hydrocarbonic gas is employed as a material gas, from which the plasma is caused by the ion sources 21.

Applying a negative bias to the substrate holder accelerates $CxHy^+$ dissolved by the plasma to form the DLC film on the gauge block.

A film forming condition for the DLC film includes: a pressure of from $10^{-4}$ to $10^{-5}$ Torr inside the chamber; a temperature of from room temperature to 200° C.; and timing of from 0.5–2 hours. Under such conditions, a DLC film 2 with a thickness of 50–2000 nm can be formed over the reference surface A of the gauge block body 1. Where the formation of such the super thin film, the DLC film 2, can maintain the dimension D between the reference surfaces A of the gauge block body 1 within a tolerance range without further need of finish polishing again.

FIG. 1B shows surfaces other than the reference surfaces A in a state that they are also coated with the DLC films. Coating the whole surface with the DLC film is effective to achieve a rust-inhibiting effect and eliminates the need for a special masking.

The absolute tolerance value of the dimension between the reference surfaces varies in accordance with the size of the gauge block. Therefore, to obtain necessary reference surfaces without the final finish polishing, the thickness of the DLC film should be controlled within a range between several nm to about 200 nm. The thickness of the DLC film formed by the ion plating can be easily controlled with a high precision within such range.

In this embodiment, since the gauge block body I is not quench hardened, its original hardness is about Hv=230. By coating the DLC film 2, a gauge block with a high hardness of Hv=3000–5000 can be obtained. For reference, a conventional quenched steel gauge block has a hardness of Hv=800, a zirconia ceramics not coated Hv=1350, and a low thermal expansion glass Hv=700.

As described above, according to this embodiment, a gauge block with a high hardness, excellent abrasion and corrosion resistances can be obtained.

Since a raw steel material is employed in the gauge block body, a gauge block is obtained, which suppresses the structural variation that is caused by quench hardening and the resulting time-variation, and which can maintain a high reliability for a long time period. In addition, special heat treatments such as subzero and temper treatments are not necessary and the cost of the gauge block is reduced.

In the above embodiment, it is also effective at the stage of FIG. 1A to partially quench only the reference surfaces A of the gauge block body 1. This partial quench hardening can be performed in practice by a high frequency quenching method (a method of partial heating by flowing an induced current from the primary coil that is a coil contained in a high frequency heating device into a work that is the secondary coil), a carburization quenching method and a nitrization method.

Such partial quench hardening can prevent a dent from occurring when the whole body is still a raw steel material. It also insures the abrasion and corrosion resistances of the reference surface to some extent even if the super thin DLC film is worn through use. In addition, unless the gauge block is quench hardened entirely, the structural variation and the resulting time-variation can be suppressed.

Although the above embodiment describes the gauge block composed of a raw steel material coated with DLC, the present invention is not limited to this embodiment, rather a gauge block composed of ceramics or low thermal expansion glass coated with DLC may also be employed.

According to the present invention, the DLC coating is performed as described above. Accordingly, it can provide a gauge block, which has excellent abrasion and corrosion resistances without time-dependent changes in dimension and which can be produced inexpensively.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A gauge block having an exterior surface, comprising:
   a gauge block body made of a not hardened raw steel material; and
   a diamond-like carbon film coated over said exterior surface.

2. The gauge block of claim 1, wherein said diamond-like carbon film is formed amorphous.

3. The gauge block of claim 1, wherein said diamond-like carbon film is coated by a physical vapor desposition.

4. The gauge block of claim 1, wherein said diamond-like carbon film has a thickness of 200 nm or less.

* * * * *